(12) United States Patent
Jeong

(10) Patent No.: US 7,503,501 B2
(45) Date of Patent: Mar. 17, 2009

(54) ABNORMAL CONDITION DETECTION CIRCUIT, INTEGRATED CIRCUIT CARD HAVING THE CIRCUIT, AND METHOD OF OPERATING CPU

(75) Inventor: Ji-Hoon Jeong, Yongin-si (KR)

(73) Assignee: Samsung Electronics Co., Ltd. (KR)

( * ) Notice: Subject to any disclaimer, the term of this patent is extended or adjusted under 35 U.S.C. 154(b) by 148 days.

(21) Appl. No.: 11/341,176

(22) Filed: Jan. 27, 2006

(65) Prior Publication Data
US 2007/0018003 A1  Jan. 25, 2007

(30) Foreign Application Priority Data
Jul. 19, 2005  (KR) ............. 10-2005-0065168

(51) Int. Cl.
*G06K 19/00* (2006.01)
(52) U.S. Cl. .................. 235/487; 235/488; 235/492
(58) Field of Classification Search ............ 235/492, 235/487, 488, 132 R, 132 A, 132 E; 714/30; 327/142
See application file for complete search history.

(56) References Cited

U.S. PATENT DOCUMENTS

| | | | | |
|---|---|---|---|---|
| 4,575,621 A | * | 3/1986 | Dreifus ................. | 235/380 |
| 5,465,349 A | * | 11/1995 | Geronimi et al. ......... | 714/30 |
| 5,715,431 A | * | 2/1998 | Everett et al. ............ | 711/156 |
| 5,774,702 A | * | 6/1998 | Mitsuishi et al. ......... | 713/501 |
| 5,983,328 A | * | 11/1999 | Potts et al. .............. | 711/157 |
| 6,314,151 B1 | * | 11/2001 | Fukaishi ................. | 375/376 |
| 7,159,153 B2 | * | 1/2007 | Kim ...................... | 714/48 |
| 2003/0149914 A1 | * | 8/2003 | Kim ...................... | 714/30 |

FOREIGN PATENT DOCUMENTS

| | | |
|---|---|---|
| JP | 2003-256793 A | 9/2003 |
| KR | 10-2004-0106075 A | 12/2004 |
| KR | 10-0471147 B1 | 2/2005 |

* cited by examiner

*Primary Examiner*—Daniel A. Hess
*Assistant Examiner*—Paultep Savusdiphol
(74) *Attorney, Agent, or Firm*—Myers Bigel Sibley & Sajovec

(57) ABSTRACT

An abnormal condition detection circuit, an integrated circuit (IC) card having a central processing unit (CPU), and a method of operating the CPU, allow the CPU to be reset when an abnormal condition is detected in the IC card. The IC card includes the CPU, a non-volatile memory, an abnormal condition detection circuit, and a reset signal generator. The IC card includes detectors that detect a corresponding abnormal condition in the IC card, and an enable signal generation circuit that generates a reset enable signal and an interrupt enable signal in response to an interrupt control signal and a detection signal output from at least one of the detectors. The reset signal generator generates a reset signal in response to the reset enable signal. The CPU is reset in response to the reset signal and interrupted in response to the interrupt enable signal.

9 Claims, 4 Drawing Sheets

US 7,503,501 B2

ABNORMAL CONDITION DETECTION CIRCUIT, INTEGRATED CIRCUIT CARD HAVING THE CIRCUIT, AND METHOD OF OPERATING CPU

CROSS-REFERENCE TO RELATED PATENT APPLICATIONS

This application claims the priority of Korean Patent Application No. 10-2005-0065168, filed on Jul. 19, 2005, in the Korean Intellectual Property Office, the disclosure of which is incorporated herein in its entirety by reference.

FIELD OF THE INVENTION

The present invention relates to semiconductor devices, and more particularly, to integrated circuit (IC) cards, circuits therefor, and methods of operating same.

BACKGROUND OF THE INVENTION

Smart cards (also referred to as integrated circuit (IC) cards), are well known mobile data processing devices with a built-in central processing unit (CPU). An IC card generally includes an IC card substrate in which IC card devices are integrated. An IC card also may include an abnormal condition detection circuit that detects an abnormal condition in the smart card, and a reset signal generator that generates a reset signal for resetting the overall operation of the smart card in response to a signal output from the abnormal condition detection circuit, so as to reduce or prevent damage to the smart card due to a change in an external environment and/or prevent security breaches.

FIG. 1 is a block diagram of a conventional smart card 10. Referring to FIG. 1, the smart card 10, which is an IC card or a chip, includes an IC card substrate 28 which may be fabricated of paper and/or plastic. Included in the substrate 28 are a CPU 12, a random access memory (RAM) 14, a read-only memory (ROM) 16, a non-volatile memory 18, a peripheral circuit 20, and a security circuit 22. The non-volatile memory 18 may be embodied as EEPROM (electrically erasable and programmable ROM).

The CPU 12 executes an operating system (OS) program. The RAM 14 stores data generated when the CPU 12 executes the OS program. The ROM 16 stores the OS program and other programs. The non-volatile memory 18 stores various application programs and predetermined data controlled by the CPU 12.

The security circuit 22 includes an abnormal condition detector 24 and a reset signal generator 26. When at least one of ambient conditions (voltage, frequency, temperature, light, and so on) of the CPU 12 or the smart card 10 in which the CPU 12 is implemented, does not fall within a predetermined range, e.g., specifications, the abnormal condition detector 24 detects the at least one ambient condition, generates a detection signal DET as the detecting result, and outputs the detection signal DET to the CPU 12 and the reset signal generator 26. Then, the CPU 12 recognizes that the at least one abnormal condition occurs in the smart card 10, in response to the detection signal DET.

The reset signal generator 26 generates a reset signal RST for resetting the CPU 12, the non-volatile memory 18, and the peripheral circuit 20, in response to the detection signal DET.

A smart card, such as that illustrated in FIG. 1, is directly reset when an abnormal condition due to a change in an internal and/or external environment is detected therein. Since the smart card is reset, a user generally can neither learn about the abnormal condition that causes the smart card 10 to be reset, nor recover the data stored in the RAM 14, which is a volatile memory, since the data is initialized upon reset.

Korean Published Patent Applications 10-0471147 and 10-2004-0106075, Japanese Patent Application 2003-021797, and U.S. Pat. No. 5,465,349 describe circuits for IC cards that allow detection information and/or other information to be stored prior to a reset.

SUMMARY OF THE INVENTION

Some embodiments of the present invention provide an integrated circuit (IC) card with a central processing unit (CPU), which is capable of not only resetting the CPU but also generating an interrupt to allow the CPU to perform various operations that may be desired, when an abnormal condition is detected in the IC card; and a method of operating the CPU. Some embodiments of the present invention also provide an abnormal condition detection circuit capable of controlling activation/deactivation of a detection signal that indicates an abnormal condition to be detected in an IC card having a CPU, based on an interrupt control signal.

According to some embodiments of the present invention, there is provided an IC card with a built-in CPU, which is capable of not only resetting the CPU but also generating an interrupt even when an abnormal condition is detected in the IC card. The IC card includes an IC card substrate that itself includes the CPU, a non-volatile memory, an abnormal condition detection circuit, and a reset signal generator.

In some embodiments, an integrated circuit card comprises an integrated circuit card substrate that itself includes a central processing unit, a plurality of detectors, a respective one of which is configured to detect a corresponding abnormal condition in the integrated circuit card and to output a detection signal indicative of the abnormal condition, an enable signal generation circuit that is configured to generate a reset enable signal and an interrupt enable signal, in response to an interrupt control signal and the detection signal output from at least one of the detectors, and a reset signal generator that is configured to generate a reset signal in response to the reset enable signal. The central processing unit is configured to be reset in response to the reset signal and to be interrupted in response to the interrupt enable signal.

In some embodiments, the enable signal generation circuit comprises a plurality of monitoring registers, a respective one of which is configured to receive and store the detection signals output from their corresponding detectors. A plurality of control registers are configured to store data for controlling activation of signals output from their corresponding monitoring registers. A detection signal generation circuit is configured to generate a first detection signal in response to signals output from the monitoring registers and signals output from the control registers. A storage circuit is configured to store the interrupt control signal. An inverter is configured to invert a signal output from the storage circuit. A first AND circuit is configured to perform an AND operation on a signal output from the inverter and the first detection signal and to output the reset enable signal as an operation result. A second AND circuit is configured to perform an AND operation on the signal output from the storage circuit and the first detection signal and to output the interrupt enable signal as an operation result.

When the first detection signal is activated, the enable signal generation circuit generates the reset enable signal and the interrupt enable signal, which are complementary signals, in response to the interrupt control signal.

According to yet other embodiments of the present invention, there is provided a method of operating a central processing unit of an integrated circuit card. The method includes detecting at least one abnormal condition in the integrated circuit card and generating at least one detection signal indicative of the at least one abnormal condition, generating a reset enable signal and an interrupt enable signal in response to an interrupt control signal and the at least one detection signal, generating a reset signal in response to the reset enable signal, resetting the central processing unit in response to the reset signal, and interrupting the central processing unit in response to the interrupt enable signal.

The generating of the reset enable signal and the interrupt enable signal may include storing detection signals output from a plurality of detectors in a corresponding plurality of monitoring registers, generating a first detection signal in response to a control signal stored in a corresponding control register of a plurality of control registers and a signal output from a corresponding monitoring register of the monitoring registers, generating the reset enable signal by performing an AND operation on an inverted signal of the interrupt control signal and the first detection signal, and generating the interrupt enable signal by performing the AND operation on the interrupt control signal and the first detection signal.

BRIEF DESCRIPTION OF THE DRAWINGS

The above and other aspects and advantages of the present invention will become more apparent by describing in detail exemplary embodiments thereof with reference to the attached drawings in which.

DETAILED DESCRIPTION OF THE INVENTION

Figure 1:
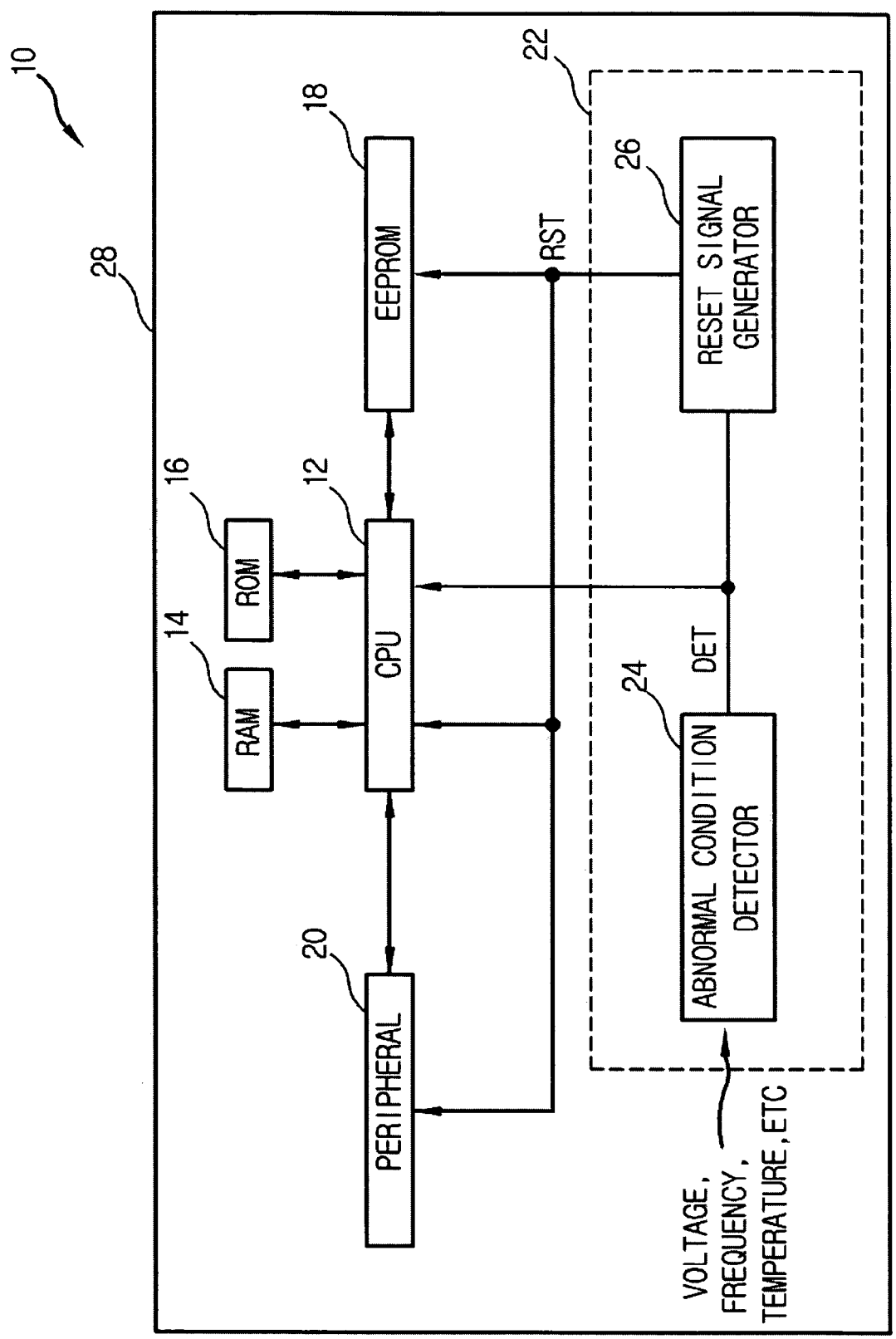
FIG. 1 is a block diagram of a conventional smart card.

The present invention now will be described more fully hereinafter with reference to the accompanying drawings, in which illustrative embodiments of the invention are shown. However, this invention may be embodied in many different forms and should not be construed as limited to the embodiments set forth herein. Rather, these embodiments are provided so that this disclosure will be thorough and complete, and will fully convey the scope of the invention to those skilled in the art.

It will be understood that when an element is referred to as being "coupled", "connected" or "responsive" to another element, it can be directly coupled, connected or responsive to the other element or intervening elements may also be present. In contrast, when an element is referred to as being "directly coupled", "directly connected" or "directly responsive" to another element, there are no intervening elements present. Like numbers refer to like elements throughout. As used herein the term "and/or" includes any and all combinations of one or more of the associated listed items and may be abbreviated by "/".

It will also be understood that, although the terms first, second, etc. may be used herein to describe various elements, these elements should not be limited by these terms. These terms are only used to distinguish one element from another element.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The present invention is described in part below with reference to block diagrams and/or flowcharts of methods, systems and computer program products according to embodiments of the invention. It will be understood that a block of the block diagrams and/or flowcharts, and combinations of blocks in the block diagrams and/or flowcharts, may be implemented at least in part by computer program instructions. These computer program instructions may be provided to one or more enterprise, application, personal, pervasive and/or embedded computer systems, such that the instructions, which execute via the computer system(s) create means, modules, devices and/or methods for implementing the functions/acts specified in the block diagram block or blocks. Combinations of general purpose computer systems and/or special purpose hardware also may be used in other embodiments.

These computer program instructions may also be stored in memory of the computer system(s) that can direct the computer system(s) to function in a particular manner, such that the instructions stored in the memory produce an article of manufacture including computer-readable program code which implements the functions/acts specified in block or blocks. The computer program instructions may also be loaded into the computer system(s) to cause a series of operational steps to be performed by the computer system(s) to produce a computer implemented process such that the instructions which execute on the processor provide steps for implementing the functions/acts specified in the block or blocks. Accordingly, a given block or blocks of the block diagrams and/or flowcharts provides support for methods, computer program products and/or systems (structural and/or means-plus-function).

It should also be noted that in some alternate implementations, the functions/acts noted in the flowcharts may occur out of the order noted in the flowcharts. For example, two blocks shown in succession may in fact be executed substantially concurrently or the blocks may sometimes be executed in the reverse order, depending upon the functionality/acts involved. Finally, the functionality of one or more blocks may be separated and/or combined with that of other blocks.

Figure 2:
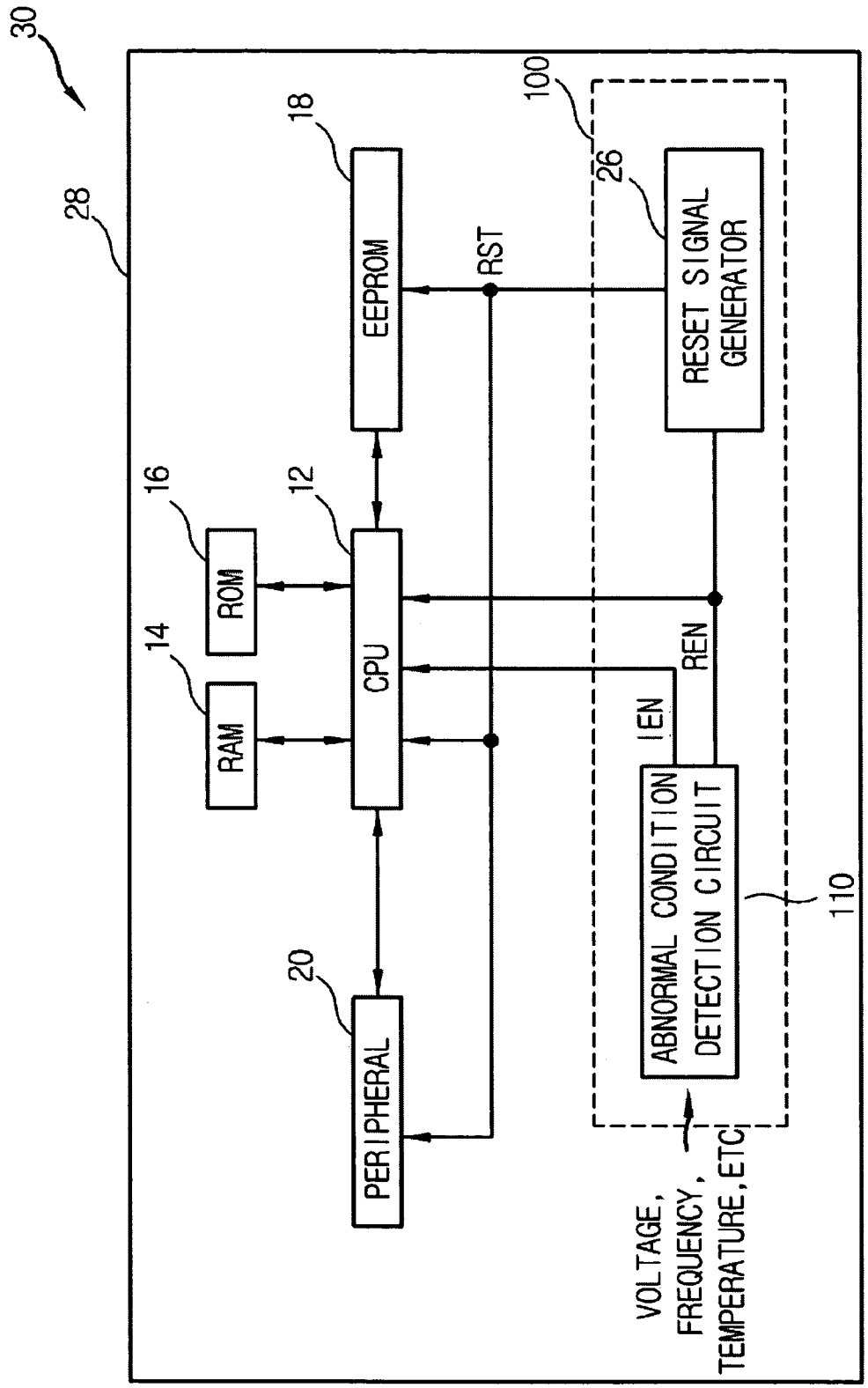
FIG. 2 is a block diagram of a smart card according to some embodiments of the present invention.

FIG. 2 is a block diagram of a smart card 30 according to some embodiments of the present invention. The smart card 30 includes a smart card (IC card) substrate 28 which may be fabricated of paper and/or plastic. Included in the substrate 28 are a central processing unit (CPU) 12, a random access memory (RAM) 14, a read-only memory (ROM) 16, a nonvolatile memory 18, a peripheral circuit 20, and a security circuit 100.

The security circuit 100 includes an abnormal condition detection circuit 110 and a reset signal generator 26. When at least one of internal/external conditions (voltage, frequency, temperature, light, removal of a protection layer, glitch, etc.) of the smart card 30 does not fall within a predetermined range, e.g., specifications, the abnormal condition detection circuit 110 detects the at least one abnormal condition, generates a detection signal, generates a reset enable signal REN and an interrupt enable signal IEN in response to a control signal and the detection signal, outputs the reset enable signal REN to the CPU 12 and the reset signal generator 26, and outputs the interrupt enable signal IEN to the CPU 12.

However, although the abnormal condition detection circuit 110 detects the at least one abnormal condition, the CPU 12 is capable of performing not only a reset operation but also the other jobs, in response to the interrupt enable signal IEN.

Figure 3:
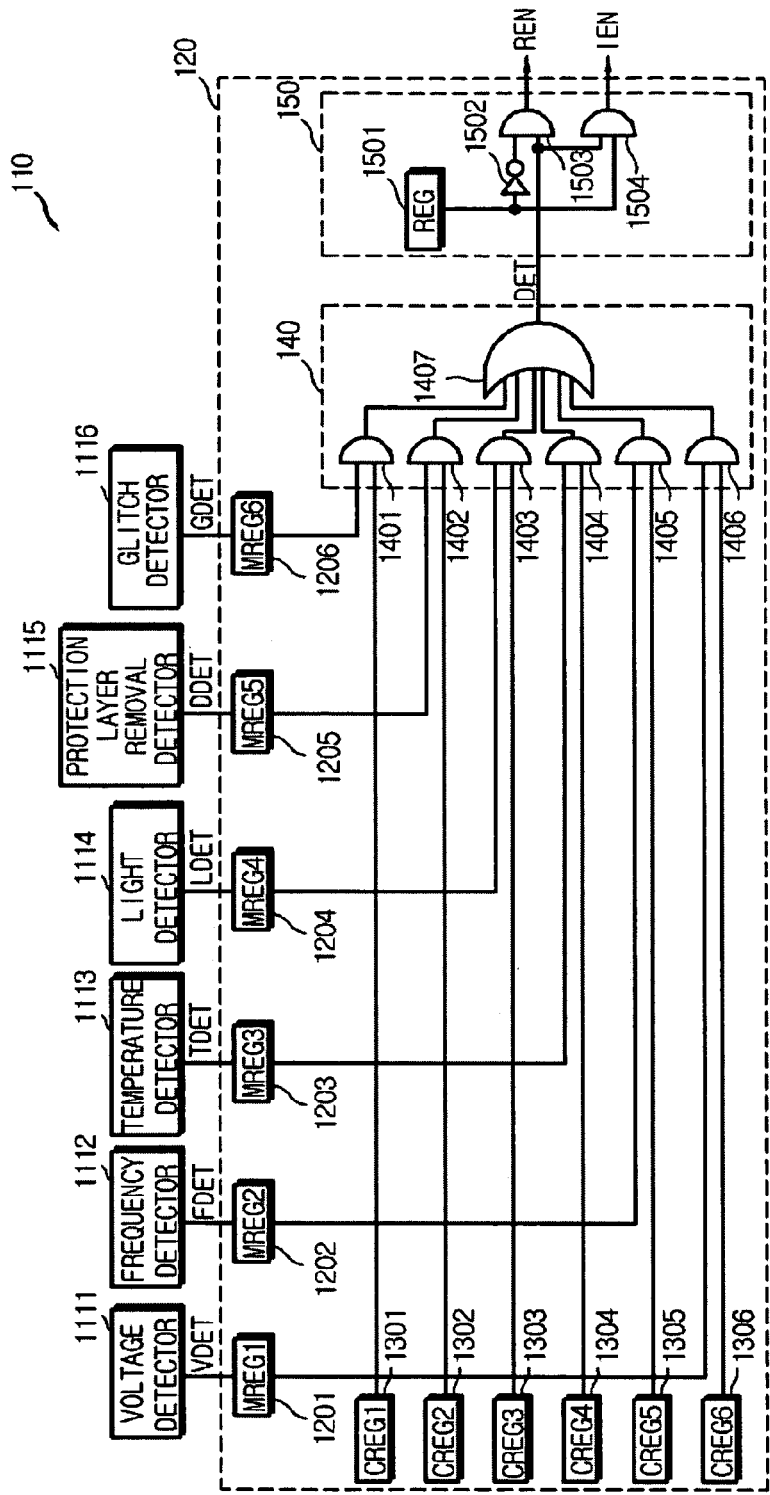
FIG. 3 is a circuit diagram of an abnormal condition detection circuit illustrated in FIG. 2 according to some embodiments of the present invention.

FIG. 3 is a circuit diagram of an abnormal condition detection circuit 110 of FIG. 2 according to some embodiments of the invention. Referring to FIG. 3, the abnormal condition detection circuit 110 includes a plurality of detectors 1111 through 1116 (e.g., a voltage detector 1111, a frequency detector 1112, a temperature detector 1113, a light detector 1114, a protection layer removal detector 1115, and/or a glitch detector 1116) and an enable signal generation circuit 120.

The voltage detector 1111 detects a case where an external voltage does not fall within a predetermined voltage range, and generates a detection signal VDET indicative of the detecting result. The frequency detector 1112 detects a case where an external input frequency does not fall within a predetermined frequency range, and generates a detection signal FDET indicative of the detecting result.

The temperature detector 1113 detects a case where external input temperature does not fall within a predetermined temperature range, and generates a detection signal TDET indicative of the detecting result. The light detector 1114 detects a case where external input light does not fall within a predetermined light range, and generates a detection signal LDET indicative of the detecting result.

The protection layer removal detector 1115 detects a case where a protection layer (such as a silicon oxide layer, etc.) on a surface of a smart card 30 (or a chip) is removed, and generates a detection signal DDET indicative of the detecting result. The glitch detector 1116 detects whether a smart card 30 (or a chip) malfunctions due to external input noise, and generates a detection signal GDET indicative of the detecting result.

For convenience for explanation, FIG. 3 illustrates that the smart card 30 includes the voltage detector 1111, the frequency detector 1112, the temperature detector 1113, the light detector 1114, the protection layer removal detector 1115, and/or the glitch detector 1116. However, the types of detectors to be included in the smart card 30 are not limited. The smart card 30 may include various types of detectors for detecting attacks by intruders and/or abnormal operating conditions, including combinations and subcombinations of the detectors 1111-1116 and/or other detectors.

Further, it is assumed that internal/external conditions (voltage, frequency, temperature, light, removal of a protection layer, glitch, etc.) of the smart card 30 do not fall within predetermined ranges, the voltage detector 1111, the frequency detector 1112, the temperature detector 1113, the light detector 1114, the protection layer removal detector 1115, and the glitch detector 1116 generate the detection signals VDET, FDET, TDET, LDET, DDET, and GDET at a high level (or a logic "1"), respectively.

The enable signal generation circuit 120 generates a reset enable signal REN and an interrupt enable signal IEN, in response to an interrupt control signal stored in a storage circuit 1501 and a detection signal VDET, FDET, TDET, LDET, DDET, and/or GDET output from at least one of the voltage detector 1111, the frequency detector 1112, the temperature detector 1113, the light detector 1114, the protection layer removal detector 1115, and/or the glitch detector 1116.

The enable signal generation circuit 120 includes a plurality of monitoring registers 1201 through 1206, a plurality of control registers 1301 through 1306, a detection signal generation circuit 140, and a signal control circuit 150.

The monitoring registers 1201 through 1206 receive and store the detection signals VDET, FDET, TDET, LDET, DDET, and/or GDET output from the voltage detector 1111, the frequency detector 1112, the temperature detector 1113, the light detector 1114, the protection layer removal detector 1115, and/or the glitch detector 1116, respectively. That is, the monitoring registers 1201 through 1206 store the detection signals VDET, FDET, TDET, LDET, DDET, and/or GDET generated when the corresponding voltage detector 1111, the frequency detector 1112, the temperature detector 1113, the light detector 1114, the protection layer removal detector 1115, and/or the glitch detector 1116 operate, respectively.

The control registers 1301 through 1306 store data for controlling activation of signals output from the corresponding monitoring registers 1206 through 1201, respectively. Each of the control registers 1301 through 1306 may be set at a high level or a low level (or a logic "0").

For instance, when a control register 1301 is set at a low level, a signal output from an AND gate 1401 is at a low level independent of a level output from the voltage detector 1111. In other words, when the control register 1301 is set at a low level, it is possible to obtain the same effect obtained when the voltage detector 1111 is deactivated.

The detection signal generation circuit 140 includes a plurality of AND gates 1401 through 1406 and an OR gate 1407. The AND gates 1401 through 1406 receive and perform an AND operation on the signals output from the corresponding monitoring registers 1201 through 1206 and the signals output from the corresponding control registers 1301 through 1306, and output the operation results to the OR gate 1407, respectively.

The OR gate 1407 receives and performs an OR operation on the operation results from the AND gates 1401 through 1406, and outputs the operation result as a first detection signal DET.

The signal control circuit 150 includes a storage circuit 1501, an inverter 1502, a reset enable signal generation circuit 1503, and an interrupt enable signal generation circuit 1504.

The storage circuit 1501 may be embodied as a register or a latch, and stores an interrupt control signal for controlling the level of the first detection signal DET received from the OR gate 1407.

The inverter 1502 inverts a signal output from the storage circuit 1501 such as an interrupt control register. The reset enable signal generation circuit 1503 may be embodied as an AND gate, and generates a reset enable signal REN by performing an AND operation on the first detection signal DET output from the OR gate 1407 and a signal output from the inverter 1502. The CPU 12 recognizes that an abnormal condition occurs in the smart card 30, based on the reset enable signal REN.

The interrupt enable signal generation circuit 1504 generates an interrupt enable signal IEN by performing an AND operation on a signal output from the storage circuit 1501 and a first detection signal DET output from the OR gate 1407.

Figure 4:
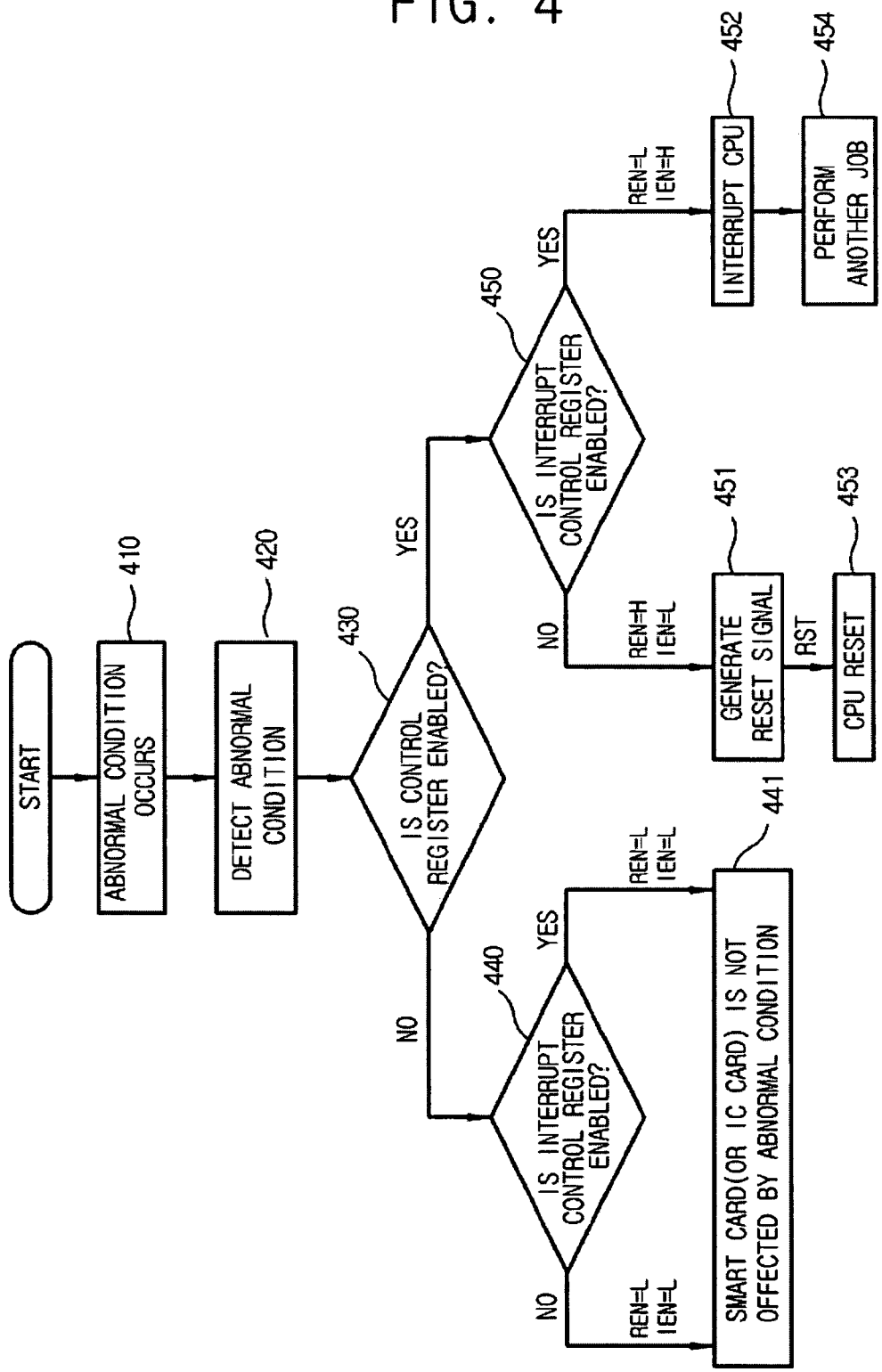
FIG. 4 is a flowchart illustrating operations of a smart card, according to some embodiments of the present invention.

FIG. 4 is a flowchart illustrating operations of a smart card according to some embodiments of the present invention. The operations of the smart card 30 will now be described with reference to FIGS. 2 through 4.

First, when at least one of abnormal conditions (voltage, frequency, temperature, light, removal of a protection layer, glitch, etc.), which do not fall within predetermined ranges, occurs in the smart card 30 (block 410), a corresponding detector 1111, 1112, 1113, 1114, 1115, and/or 1116 detects the at least one abnormal condition and outputs a detection signal that is at a high level (or a logic "1") (block 420).

The monitoring registers 1201 through 1206 receive and store the detection signals VDET, FDET, TDET, LDET, DDET, and/or GDET output from the corresponding detectors 1111 through 1116, respectively.

When the control registers 1301 through 1306 are set at a high level (logic 1), that is, they are enabled (block 430), the AND gates 1401 through 1406, respectively, output the detection signals GDET, DDET, LDET, TDET, FDET, and/or VDET, which are respectively stored by the corresponding monitoring registers 1206 through 1201, without changing their levels.

However, when the control registers 1301 through 1306 are set at a low level (logic 0), that is, they are disabled (block 430), the AND gates 1401 through 1406 respectively output the detection signals GDET, DDET, LDET, TDET, FDET, and/or VDET that are all at a low level. In this case, the first detection signal DET output from the OR gate 1407 is at a low level. Thus, both the reset enable signal REN and the interrupt enable signal TEN are at a low level irrespective of whether the storage circuit 1501 is at a high level or a low level (block 440).

Accordingly, a reset signal generator 26 outputs a reset signal RST having a low level in response to the reset enable signal REN having a low level. Therefore, the CPU 12, the non-volatile memory 18, and the peripheral circuit 20 are not reset.

That is, when the control registers 1301 through 1306 are disabled, the operation of the smart card 30 is not affected even when the corresponding detectors 1116 through 1111 detect abnormal conditions (block 441). Accordingly, the smart card 30 operates normally.

However, when the control registers 1301 through 1306 are set at a high level, that is, when they are enabled (block 430), the AND gates 1401 through 1406 respectively output the detection signals GDET, DDET, LDET, TDET, FDET, and/or VDET, which are respectively output from the corresponding detectors 1116 through 1111, and thus, the signal output from the OR gate 1407 is at a high level.

Therefore, when the storage circuit 1501 (or, the interrupt control register) is set at a low level, i.e., when it is disabled (block 450), the reset enable signal generation circuit 1503 outputs the reset enable signal REN having a high level to the CPU 12 and the reset signal generator 26, and the interrupt enable signal generation circuit 1504 outputs the interrupt enable signal IEN having a low level to the CPU 12.

The reset signal generator 26 generates the reset signal RST having a high level, in response to the reset enable signal REN having a high level (block 451), and thus, the CPU 12, the non-volatile memory 18 such as EEPROM, and the peripheral circuit 20 are reset in response to the reset signal RST (block 453).

However, when the storage circuit 1501 is set at a high level, that is, when it is enabled (block 450), the reset enable signal generation circuit 1503 outputs the reset enable signal REN having a low level to the CPU 12 and the reset signal generator 26, and the interrupt enable signal generator 1504 outputs the interrupt enable signal IEN having a high level to the CPU 12.

When the storage circuit 1501 is set at a high level and the first detection signal (DET) is activated, the reset enable signal (REN) and the interrupt enable signal (IEN) are complementary signals.

Thus, the reset signal generator 26 generates the reset signal RST having a low level, in response to the reset enable signal REN having a low level, the CPU 12, the non-volatile memory 18 such as EEPROM, and the peripheral circuit 20 are not reset. In this case, since being interrupted in response to the interrupt enable signal IEN having a high level (block 452), the CPU 12 is not reset and is capable of performing a job that is desired (block 454). Therefore, the user and/or CPU 12 can check an abnormal condition that occurred in the smart card 30.

When an abnormal condition is detected, the reset signal generator 26 of a conventional smart card 10 may directly reset the CPU 12 by outputting the reset signal RST activated to the CPU 12.

In contrast, the reset signal generator 26 of the smart card 30 having the abnormal condition detection circuit 110, according to embodiments of the present invention, can output the reset signal RST that is activated or deactivated based on an interruption control signal (1 or 0) stored in the storage circuit 1501 even when an abnormal condition is detected. Accordingly, the CPU 12 may not be reset or interrupted even when at least one of the detectors 1111 through 1116 detects an abnormal condition.

As described above, an abnormal condition detection circuit according to some embodiments of the present invention is capable of controlling activation/deactivation of a detection signal indicative of whether an abnormal condition is detected in an IC card with a CPU, based on an interrupt control signal.

When an abnormal condition is detected in the IC card with the CPU, the IC card can not only reset the CPU but also can generate an interrupt, thereby allowing the CPU to perform various operations that may be desired.

Accordingly, the user and/or the CPU can check an abnormal condition occurring in the IC card.

Further, even when an abnormal condition occurs in the IC card, the user and/or CPU can perform a job therein, and recover data stored in a non-volatile memory of the IC card.

In the drawings and specification, there have been disclosed embodiments of the invention and, although specific terms are employed, they are used in a generic and descriptive sense only and not for purposes of limitation, the scope of the invention being set forth in the following claims.

What is claimed is:

1. A circuit for detecting an abnormal condition in an integrated circuit card, comprising the following in an integrated circuit card substrate:
    a plurality of detectors, a respective one of which is configured to detect a corresponding abnormal condition in the integrated circuit card;
    a plurality of monitoring registers, a respective one of which is configured to receive and store detection signals output from a corresponding detector;

a plurality of control registers, a respective one of which is configured to store data for controlling activation of signals output from a corresponding monitoring register;

a detection signal generation circuit that is configured to generate a first detection signal in response to signals output from the monitoring registers and signals output from the control registers; and a signal control circuit that is configured to output a reset enable signal and an interrupt enable signal in response to an interrupt control signal and the first detection signal, wherein the reset enable signal is of opposite phase from the interrupt control signal and the interrupt enable signal is in phase with the interrupt control signal.

2. The circuit of claim 1, wherein the detection signal generation circuit comprises:

a plurality of AND gates; and an OR gate is configured to receive signals output from the AND gates, to perform an OR operation on the received signals, and to output the first detection signal as an operation result, wherein the AND gates are configured to receive the signals output from their corresponding monitoring registers and their corresponding control registers, respectively.

3. The circuit of claim 1, wherein the signal control circuit comprises:

a storage circuit configured to store the interrupt control signal;

an inverter configured to invert a signal output from the storage circuit;

a first AND circuit configured to perform an AND operation on a signal output from the inverter and the first detection signal and to output the reset enable signal as the operation result; and a second AND circuit configured to perform an AND operation on the signal output from the storage circuit and the first detection signal and to output the interrupt enable signal as an operation result.

4. The circuit of claim 1, wherein when the first detection signal is activated, the reset enable signal and the interrupt enable signal are complementary signals.

5. The circuit of claim 1 in combination with a central processing unit in the integrated circuit card that is configured to be interrupted in response to the interrupt enable signal and to be reset in response to the reset enable signal.

6. An integrated circuit card comprising:

an integrated circuit card substrate, the integrated circuit card substrate comprising:

a central processing unit;

a plurality of detectors, a respective one of which is configured to detect a corresponding abnormal condition in the integrated circuit card and to output a detection signal indicative of the abnormal condition;

an enable signal generation circuit that is configured to generate a reset enable signal and an interrupt enable signal, in response to an interrupt control signal and the detection signal output from at least one of the detectors; and a reset signal generator that is configured to generate a reset signal in response to the reset enable signal;

wherein the enable signal generation circuit comprises:

a plurality of monitoring registers, a respective one of which is configured to receive and store the detection signals output from a corresponding detector;

a plurality of control registers, a respective one of which is configured to store data for controlling activation of signals output from a corresponding monitoring register;

a detection signal generation circuit that is configured to generate a first detection signal in response to signals output from the monitoring registers and signals output from the control registers;

a storage circuit that is configured to store the interrupt control signal;

an inverter that is configured to invert a signal output from the storage circuit;

a first AND circuit that is configured to perform an AND operation on a signal output from the inverter and the first detection signal and to output the reset enable signal as an operation result; and a second AND circuit that is configured to perform an AND operation on the signal output from the storage circuit and the first detection signal and to output the interrupt enable signal as an operation result.

7. The integrated circuit card of claim 6, wherein when the first detection signal is activated, the enable signal generation circuit is configured to generate the reset enable signal and the interrupt enable signal, which are complementary signals, in response to the interrupt control signal.

8. The integrated circuit card of claim 6, wherein the detection signal generation circuit comprises:

a plurality of AND gates; and an OR gate is configured to receive signals output from the AND gates, to perform an OR operation on the received signals, and to output the first detection signal as an operation result, wherein the AND gates are configured to receive the signals output from their corresponding monitoring registers and their corresponding control registers, respectively.

9. A method of operating a central processing unit of an integrated circuit card, comprising:

detecting at least one abnormal condition in the integrated circuit card and generating at least one detection signal indicative of the at least one abnormal condition;

generating a reset enable signal and an interrupt enable signal in response to an interrupt control signal and the at least one detection signal;

generating a reset signal in response to the reset enable signal; resetting the central processing unit in response to the reset signal; and interrupting the central processing unit in response to the interrupt enable signal;

wherein the generating the reset enable signal and the interrupt enable signal comprises:

storing detection signals output from a plurality of detectors in a corresponding plurality of monitoring registers;

generating a first detection signal, in response to a control signal stored in a corresponding control register of a plurality of control registers and a signal output from a corresponding monitoring register of the monitoring registers;

generating the reset enable signal by performing an AND operation on an inverted signal of the interrupt control signal and the first detection signal; and generating the interrupt enable signal by performing the AND operation on the interrupt control signal and the first detection signal.

* * * * *